Patented July 22, 1952

2,604,480

UNITED STATES PATENT OFFICE 2,604,480

1-AMINO-2-BROMO-4-HYDROXY-ANTHRA-QUINONE BY HYDROLYSIS OF 1-AMINO 2,4-DIBROM ANTHRAQUINONE

George W. Seymour, Millburn, and Victor S. Salvin, Summit, N. J., and Walter R. Edwards, Cumberland, Md., assignors to Celanese Corporation of America, a corporation of Delaware No Drawing. Application August 29, 1947, Serial No. 771,392

4 Claims. (Cl. 260—380)

This invention relates to the production of 1-amino-2-brom-4-hydroxy-anthraquinone by the hydrolysis of 1-amino-2,4-dibrom-anthraquinone.

An object of this invention is to provide an improved process for the preparation of 1-amino-2-brom-4-hydroxy-anthraquinone by the hydrolysis of 1-amino-2,4-dibrom-anthraquinone employing boric acid in concentrated sulfuric acid as the hydrolyzing agent.

Other objects of this invention will appear from the following detailed description.

We have now found that 1-amino-2,4-dibrom-anthraquinone may be hydrolyzed in an efficient and economical manner to 1-amino-2-brom-4-hydroxy-anthraquinone by reacting 1-amino-2,4-dibrom-anthraquinone for 1 to 3 hours at a temperature of from 130 to 170° C., and preferably, at 150 to 155° C., in solution in 150 to 600% by weight of the anthraquinone compound of concentrated sulfuric acid to which has been added 18 to 70%, preferably 32%, of boric acid on the weight of the anthraquinone compound. When reaction is completed the reaction mixture is cooled to below 100° C., drowned in a large volume of water and then filtered at 60 to 70° C. through a porous stone filter. The press cake of 1-amino-2-brom-4-hydroxy-anthraquinone is resludged in water and then again filtered at a temperature of about 80° C. through the porous stone filter. The press cake here obtained is washed with a 2% aqueous sodium carbonate solution until neutral. The 1-amino-2-brom-4-hydroxy-anthraquinone obtained is of excellent purity, and improved yields of 98%, and over, based on the 1-amino-2,4-dibrom-anthraquinone reacted are obtained by our novel process.

In order further to illustrate our invention, but without being limited thereto, the following example is given:

Example 110 parts by weight of crude 1-amino-2,4-dibrom-anthraquinone containing 60% by weight of acid-insoluble inorganic impurity are slurried with 500 parts, i. e. 450% by weight, of concentrated sulfuric acid for 1 hour at 125° C. and the solution obtained filtered through a porous stone filter. The press cake remaining is slurried again with 250 parts by weight of concentrated sulfuric acid and heated for 1 hour at 125° C. The solution obtained is then filtered through a stone filter and the filtrate combined with the original filtrate. The combined filtrates are transferred to a reactor, 35 parts, i. e. 32%, by weight of boric acid are added and the reaction mixture is then heated for 2 hours at 150° C. After the resulting hydrolysis reaction is completed, the reaction mixture is run into 1500 parts by weight of water and the 1-amino-2-brom-4-hydroxy-anthraquinone precipitates from solution. The mixture is heated to from about 60 to 70° C. then filtered through a porous stone filter. The press cake obtained is resludged in 800 to 1000 parts by weight of water at 80° C. and refiltered. The press cake of 1-amino-2-brom-4-hydroxy-anthraquinone which is here obtained is then washed neutral with a 2% by weight aqueous solution of sodium carbonate. The 1-amino-2-brom-4-hydroxy-anthraquinone has a purity of 95% and the yield obtained is 98% of theory based on the 1-amino-2,4-dibrom-anthraquinone reacted.

The 1-amino-2-brom-4-hydroxy-anthraquinone may be employed for dyeing cellulose acetate or other organic derivative of cellulose textile materials in desirable red shades after being suitably dispersed and solubilized. It may also be employed as an intermediate in the production of other valuable anthraquinone dyes.

It is to be understood that the foregoing detailed description is given merely by way of illustration and that many variations may be made therein without departing from the spirit of our invention.

Having described our invention, what we desire to secure by Letters Patent is:

1. Process for the hydrolysis of 1-amino-2,4-dibrom-anthraquinone to 1-amino-2-brom-4-hydroxy-anthraquinone, which comprises adding 18 to 70% of boric acid on the weight of the anthraquinone compound to a solution of 1-amino-2,4-dibrom-anthraquinone in 150 to 600% by weight of concentrated sulfuric acid and heating the reactants to a temperature of 150 to 155° C. for 1 to 3 hours.

2. Process for the hydrolysis of 1-amino-2,4-dibrom-anthraquinone to 1-amino-2-brom-4-hydroxy-anthraquinone, which comprises adding 32% of boric acid on the weight of the anthraquinone compound in 150 to 600% by weight of concentrated sulfuric acid and heating the reactants to a temperature of 150 to 155° C. for about 2 hours.

3. Process for the hydrolysis of 1-amino-2,4-dibrom - anthraquinone to 1-amino-2-brom-4-hydroxy-anthraquinone, which comprises adding 18 to 70% of boric acid on the weight of the anthraquinone compound to a solution of 1- amino-2,4-dibrom-anthraquinone in 150 to 600% by weight of concentrated sulfuric acid and heating the reactants to a temperature of 150 to 155° C. for 1 to 3 hours, drowning the reaction mixture in water, filtering at 60 to 70° C., resludging the press cake in water, filtering at about 80° C. and washing the press cake neutral with a dilute aqueous solution of sodium carbonate.

4. Process for the hydrolysis of 1-amino-2,4-dibrom-anthraquinone to 1-amino-2-brom-4-hydroxy-anthraquinone, which comprises adding 32% of boric acid on the weight of the anthraquinone compound to a solution of 1-amino-2,4-dibrom-anthraquinone in 150 to 600% by weight of concentrated sulfuric acid and heating the reactants to a temperature of 150 to 155° C. for about 2 hours, drowning the reaction mixture in water, filtering at 60 to 70° C., resludging the press cake in water, filtering at about 80° C. and washing the press cake neutral with a 2% aqueous solution of sodium carbonate.

GEORGE W. SEYMOUR.
VICTOR S. SALVIN.
WALTER R. EDWARDS.

REFERENCES CITED

The following references are of record in the file of this patent:

UNITED STATES PATENTS

| Number | Name | Date |
| --- | --- | --- |
| 1,798,156 | Gubelmann et al. | Mar. 31, 1931 |

FOREIGN PATENTS

| Number | Country | Date |
| --- | --- | --- |
| 203,083 | Germany | Oct. 10, 1908 |
| 402,505 | Great Britain | Dec. 7, 1933 |